UNITED STATES PATENT OFFICE.

CARLO BONAFEDE, OF MILAN, ITALY.

PROCESS FOR MAKING DOUGH BY GERMINATION IN SALT SOLUTION.

1,235,420.

Specification of Letters Patent.

Patented July 31, 1917.

No Drawing.

Application filed March 3, 1916. Serial No. 81,982.

*To all whom it may concern:*

Be it known that I, CARLO BONAFEDE, a subject of the King of Italy, residing at Milan, Kingdom of Italy, have invented certain new and useful Improvements in Processes for Making Dough by Germination in Salt Solution, of which the following is a specification.

This invention refers to a process for preparing cereals so as to obtain a dough for bread, biscuit or similar products, in which no previous grinding of the grain (wheat, corn, rye or similar) is made use of.

The basis of the process is the germination of the grain, the object of which is to soften it, to raise its percentage of highly digestible substances, and to detach the external skin from the pulp.

Such germination must however be effected under special circumstances if a good and healthy product is desired. The same process can be applied both to obtain a dough where the skin also is employed (for bread of the so-called homogeneous variety) and for such other products—white bread, etc.—where only the pulp of the grain enters. The operations subsequent to the germination vary of course according to the product which is desired.

It is well known that, given favorable temperature conditions humidity is the cause of germination of living grains, the consequence being the softening of the grain, the elaboration of new and immediately assimilable substances, and the opening of the skin of the grain. If the grain be dead (as is the case in a certain percentage of every quantity of cereal) germination cannot take place, and instead of it such grains become rotten, while nauseating and poisonous substances appear in them. An essential character of this process is to produce germination under circumstances such that no rotting of such grains as are dead is allowed, so that even if the whole bulk of the grains were dead, it could still be hygienically utilized. This object is practically obtained by germinating the grain in a slowly moving lukewarm brine. For instance a 10% solution of NaCl at a temperature of 36° C. acting for 36 hours may be utilized; but any of a number of salts which are not hurtful can be employed to prevent rotting, as potassium chlorate and such. The solution may also be varied, lowering the amount of salt when a greater circulation speed is used, not however so great as to hinder or disturb germination. Germination is more rapid if the temperature be raised a little. The cereal should of course be carefully washed before and after treating, and the best results are obtained when germination is stopped at the exact moment when the embryo bores through the skin. After this the operations vary as stated according to the product which is desired (homogeneous or white).

In the former case the germinated grain is passed through any machine which is adapted to cut, divide and mince it so that the skins are reduced to exceedingly small parts which are almost invisible in the mass of dough. This becomes easy as the skins during germination become detached from the pulp and from each other. If the desired product be such that leavening be necessary, the ferment can be added during the mincing and the kneading to get a more diffused mixture and to save subsequent operations.

In the latter case, any machine which is capable of exerting a squeezing and pressing action on the grains (presses, centrifugal machines or others) is used. As a result, when the skins are opened and separated, they are subjected to a mechanical compression which causes the pulp to slip out easily and a satisfactory and perfect product is obtained, such as grinding cannot compete with.

It is advisable to wash during the pressing so as to liberate every particle of pulp from the skins.

Claims:

1. A process of preparing grain for dough making, which consists in immersing the grain in a solution of an alkaline salt to cause germination of the grain, so as to prevent putrefaction of the dead grains by the presence of the dissolved salt; and maintaining said solution in circulation.

2. A process of preparing grain for dough making, which consists in immersing the grain in a lukewarm solution of an alkaline salt to cause germination of the grain, so as to prevent putrefaction of the dead grains by the presence of the dissolved salt; and maintaining said solution in slow circulation.

3. A process of preparing grain for dough making, which consists in immersing the grain for about 36 hours in a lukewarm solution of an alkaline salt to cause germination of the grain, so as to prevent putrefaction of the dead grains by the presence of the dissolved salt; and maintaining said solution in circulation.

4. A process of preparing grain for dough making, which consists in immersing the grain for about 36 hours in brine at a temperature of about 36° C., to cause germination of the grain, so as to prevent putrefaction of the dead grains by the presence of the dissolved salt; and maintaining said solution in circulation.

In testimony whereof I affix my signature.

CARLO BONAFEDE.

Witnesses:
L. R. ARROYO,
ILO C. FUNK.